US008897756B2

(12) United States Patent
Skog et al.

(10) Patent No.: US 8,897,756 B2
(45) Date of Patent: Nov. 25, 2014

(54) CALL-TRACKING

(75) Inventors: Robert B Skog, Hässelby (SE); Jan M Gabrielsson, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 13/519,713

(22) PCT Filed: Dec. 30, 2009

(86) PCT No.: PCT/SE2009/051515
§ 371 (c)(1),
(2), (4) Date: Oct. 18, 2012

(87) PCT Pub. No.: WO2011/081584
PCT Pub. Date: Jul. 7, 2011

(65) Prior Publication Data
US 2013/0035078 A1    Feb. 7, 2013

(51) Int. Cl.
*H04M 3/42* (2006.01)
*H04M 15/08* (2006.01)
*H04M 15/00* (2006.01)
*G06Q 30/02* (2012.01)
*H04M 3/487* (2006.01)

(52) U.S. Cl.
CPC ............ *H04M 15/08* (2013.01); *H04M 3/4878* (2013.01); *H04M 15/51* (2013.01); *G06Q 30/02* (2013.01)
USPC ..................................... 455/414.1; 705/14.41

(58) Field of Classification Search
USPC ............................ 455/414.1–414.4, 415–417; 705/14.4–14.73
See application file for complete search history.

(56) References Cited

U.S. PATENT DOCUMENTS

| 7,424,442 | B2 | 9/2008 | Wong et al. | |
|---|---|---|---|---|
| 2007/0230671 | A1 | 10/2007 | Altberg et al. | |
| 2008/0162286 | A1* | 7/2008 | Lieberman et al. | 705/14 |
| 2008/0319952 | A1* | 12/2008 | Carpenter et al. | 707/3 |

FOREIGN PATENT DOCUMENTS

| EP | 2073521 A1 | 6/2006 |
|---|---|---|
| EP | 1968002 A1 | 9/2008 |
| EP | 1968003 A1 | 9/2008 |

OTHER PUBLICATIONS

International Search Report, International application No. PCT/SE2009/051515. Date of mailing: Oct. 1, 2010. Swedish Patent Office, Stockholm, Sweden.

(Continued)

*Primary Examiner* — Kashif Siddiqui
(74) *Attorney, Agent, or Firm* — Coats & Bennett, P.L.L.C.

(57) ABSTRACT

A method for call-tracking, call-tracking systems, an HTTP proxy server computer program, web server hosts, web server computer programs and computer program products are disclosed. The method comprises the following steps: forwarding a request for a web page; receiving a reply message comprising a second telephone number; retrieving and storing a first telephone number, the second telephone number, a time associated with the forwarding of the reply message, and a service provider indicator; receiving a trigger message comprising two telephone numbers; determining whether the two telephone numbers correspond to the first telephone number and the second telephone number; and, if the two telephone numbers correspond, determining, based on a time difference, whether the call has been made within a predetermined time or predetermined time interval; and, if the call has been made within the predetermined time or predetermined time interval, store information related to the call.

31 Claims, 9 Drawing Sheets

(56) References Cited

OTHER PUBLICATIONS

Mihm, David. "Be Wary of Call Tracking Numbers in Local Search." Online article dated Oct. 8, 2009. Accessed at http://searchengineland.com/be-wary-of-call-tracking-numbers-in-local-search-26895.

Blumenthal, Mike. "GoogleVoice Now Allows Use of an SMB's Primary Phone Number, Is Call Tracking Far Behind?" Online blog. Oct. 27, 2009. Accessed at http://blumenthals.com/blog/2009/10/27/googlevoice-now-allows-use-of-an-smbs-primary-phone-number-is-call-tracking-far-behind/.

Sterling, Greg. "Telmetrics Responds to Call Tracking Debate." Online blog. Oct. 23, 2009. Accessed at http://gesterling.wordpress.com/2009/10/23/telmetrics-responds-to-call-tracking-seo-issues/.

Extended European Search Report. International Application No. PCT/SE2009/051515. Date of mailing: Feb. 26, 2014. European Patent Office, Rijswijk, Netherlands.

* cited by examiner

Fig. 7
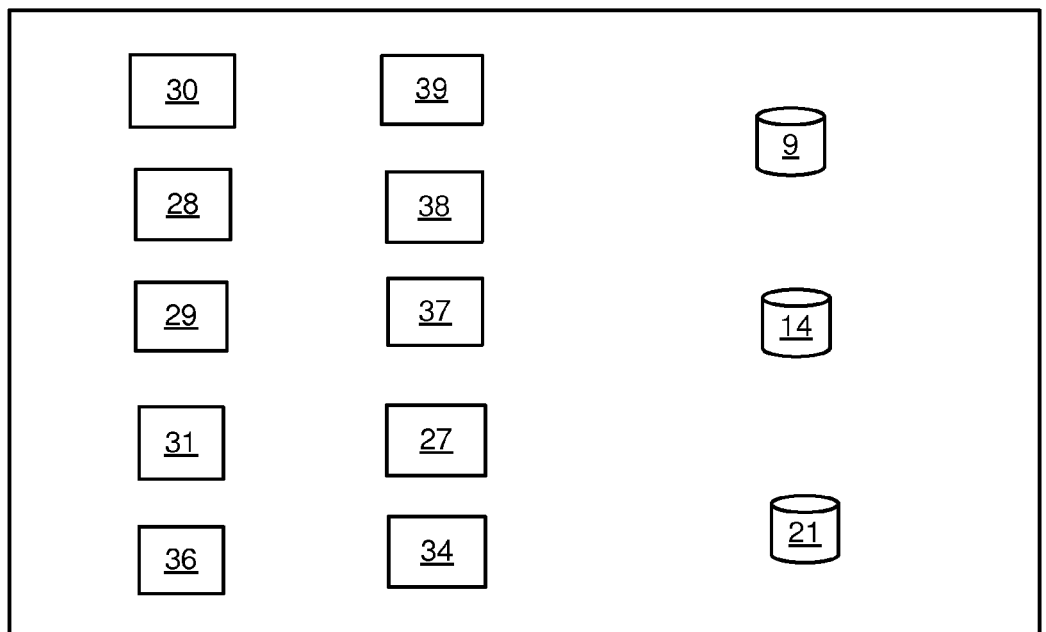
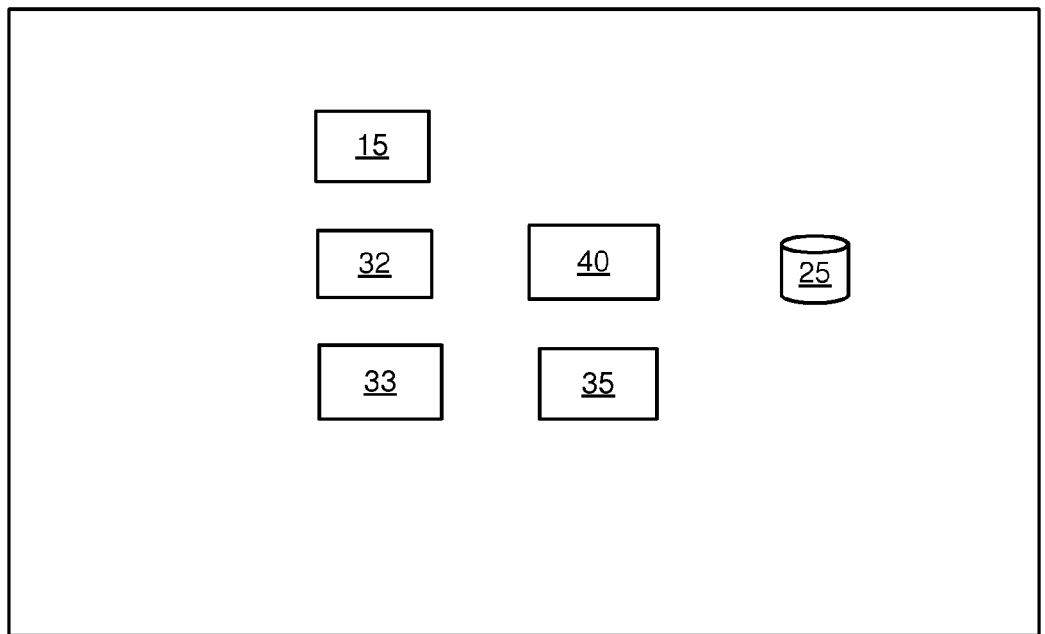

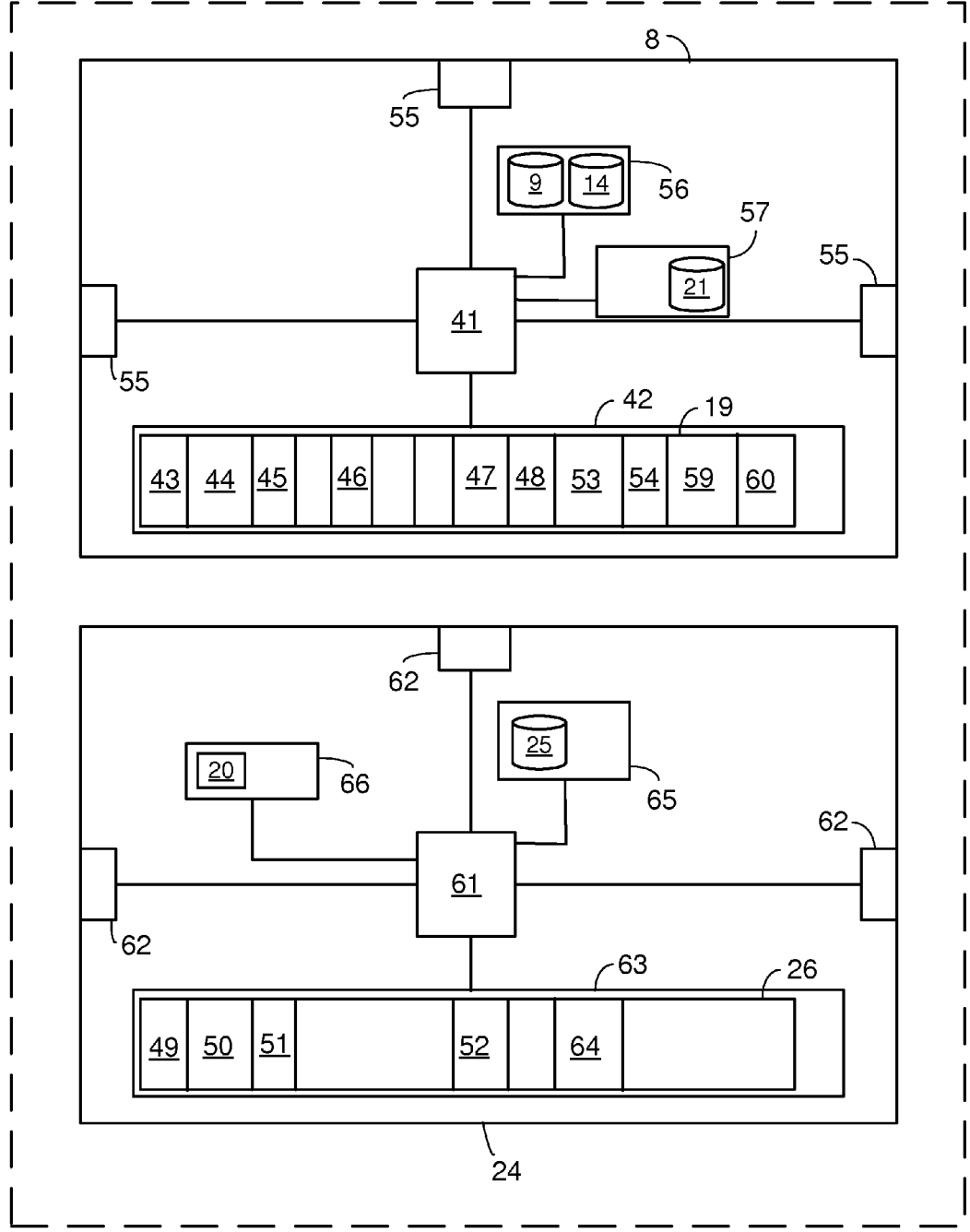

CALL-TRACKING

TECHNICAL FIELD

The invention relates to a method for call-tracking, call-tracking systems, an HTTP (HyperText Transfer Protocol) proxy server computer program, web server hosts, web server computer programs and computer program products.

BACKGROUND

Today search engines, web sites, messages sent to UEs (User Equipments) etc. display advertisements, hereinafter in the description called 'ads', for business including a telephone number to call in order to contact the business. To correlate the display of an advertisement, hereinafter in the description called 'ad', for the consumer and the subsequent telephone call placed by the consumer, typically the business is provided with a specific telephone number for that particular ad. If that number is called, it can be concluded that the ad was successful. There is typically one specific telephone number provided per ad campaign and per advertising channel to be able to understand which ad the consumer has, in a positive way, acted upon, thereby being able to, for example, assess whether an ad has been successful or not.

A comparison/correlation of data is very important for ad brokers and advertisers to evaluate how successful the ad in itself is and how successful the ad channel is, e.g. the web site or the message form that the ad was exposed on. It also enables performance based advertising models, where advertisers only pay for actions considered to have been generated by or associated with the ad. Such an action can be that a call is made to the telephone number displayed on the ad.

Existing solutions, using so-called call-tracking, requires the advertiser to be provided with many campaign specific telephone numbers and runs the risk that customers get confused about which phone number that is the advertiser's "real" phone number. Campaign numbers typically also stop working a certain time after the ad campaign has finished and customers may have remembered them as the main contact number, which is not good for the customer and the advertiser.

The company Google today runs call-tracking with local ads displayed in conjunction with a map application. Google's solution uses multiple, or specific, numbers provisioned via a service called Google Voice.

U.S. Pat. No. 8,424,442-B2 describes another example of a call-tracking system with a dynamic allocation of telephone number to an ad on a just-in-time basis; and if the telephone number is not called for a predefined period of time then the telephone number is unallocated.

SUMMARY

An object of the invention is to enable a call-tracking system where temporary telephone number associated with a certain ad does not have to be provided by a call-tracking system in order to be able to estimate the successfulness of the ad or product.

The invention relates to method performed by a call-tracking system. The method comprises the steps of:
  forwarding from a first UE, e.g. a mobile phone, associated with a first telephone number a request for a web page to a web server host;
  receiving in response to the request, a reply message comprising the web page and at least one second telephone number associated with a second UE, e.g. a fixed phone;
  forwarding the reply message to the first UE;
  retrieving the first telephone number, the second telephone number, a time associated with the forwarding of the reply message to the first UE, and an SP (Service Provider) indicator for an SP associated with the web server host, e.g. a URL (Uniform Resource Locator) of the SP;
  storing, associated with each other in a first database, the first telephone number, the second telephone number, the SP indicator and the time associated with the forwarding of the reply message;
  receiving from a proxy server a trigger message comprising two telephone numbers, said trigger message indicating a telephone call related to the two telephone numbers;
  determining whether the two telephone numbers correspond to the first telephone number and the second telephone number stored associated with each other in the first database; and,
  if the two telephone numbers correspond to the first telephone number and the second telephone number, determining, based on a time difference between the time associated with the forwarding of the reply message and a time indicative of when the telephone call was made, whether the call has been made within a predetermined time or predetermined time interval from the forwarding of the reply message; and,
  if the call has been made within the predetermined time or predetermined time interval, store information related to the call in the first database or a second database. Hereby is enabled that, based on the advertiser's own telephone number, relevant information related to a call being deemed as being related to an ad (or a product or service advertised on the ad) can be tracked and thus be reported to the SP and the advertiser. Thus confusion about the advertiser's 'real' telephone number can be avoided and a number of temporary telephone numbers does not have to be allocated.

The method may comprise the step of retrieving the second telephone number from an HTTP header of the reply message.

The method may comprise the step of retrieving the second telephone number from the web page.

The method may comprise the step of inserting in the request an information header with data indicating to the web server host that a call from the first UE to the second UE can be tracked by the call-tracking system.

The information related to the call may comprise the first telephone number, the second telephone number, the time indicative of when the telephone call was made and the SP indicator.

The method may comprise the steps of
  receiving from the web server host an ad identity comprised in the reply message;
  storing the ad identity in the first database associated with the first telephone number, the second telephone number, the SP indicator and the time associated with the forwarding of the reply message; and
  if the call has been made within the predetermined time or predetermined time interval, storing the ad identity in the second database together with the first telephone number, the second telephone number, the SP indicator and the time associated with the forwarding of the reply message.

The information related to the call may comprise a length of the call, i.e. the time from the start until the end of the telephone call.

The call-tracking system may in the method be an HTTP proxy server or a combination of the HTTP proxy server and an SCP (Service Control Point).

The invention also relates to a call-tracking system, e.g. an HTTP proxy server. The call-tracking system comprises:

- sending means configured to forward from a first UE associated with a first telephone number a request for a web page to a web server host and forwarding a reply message from the web server host to the first UE;
- receiving means configured to receive in response to the request, the reply message comprising the web page and at least one second telephone number associated with a second UE;
- retrieving means configured to retrieve the first telephone number, the second telephone number, a time associated with the forwarding of the reply message to the first UE, and a SP indicator for a service provider associated with the web server host;
- storing means configured to store, associated with each other, in a first database the first telephone number, the second telephone number, the SP indicator and the time associated with the forwarding of the reply message;
- trigger receiving means configured to receive from a proxy server a trigger message comprising two telephone numbers, said trigger message indicating a telephone call related to the two telephone numbers;
- first determining means configured to determine whether the two telephone numbers correspond to the first telephone number and the second telephone number stored associated with each other in the first database; and,
- second determining means configured to, if the two telephone numbers correspond to the first telephone number and the second telephone number, determine, based on a time difference between the time associated with the forwarding of the reply message and a time indicative of when the telephone call was made, whether the call has been made within a predetermined time or predetermined time interval from the forwarding of the reply message; and,
- a call indicator configured to store information related to the call in the first database or a second database, if the call has been made within the predetermined time or predetermined time interval.

The invention also relates to another call tracking system, which comprises an HTTP proxy server and an SCP. Here the HTTP proxy server comprises:

- sending means configured to forward from a first UE associated with a first telephone number a request for a web page to a web server host and forwarding a reply message from the web server host to the first UE;
- receiving means configured to receive in response to the request, the reply message comprising the web page and at least one second telephone number associated with a second UE;
- retrieving means configured to retrieve the first telephone number, the second telephone number, a time associated with the forwarding of the reply message to the first UE, and a SP indicator for a service provider associated with the web server host;
- storing means configured to store, associated with each other, in a first database the first telephone number, the second telephone number, the SP indicator and the time associated with the forwarding of the reply message;
- a call indicator configured to store, in the first database or a second database, information related to a telephone call having been made between the first telephone number and the second telephone number within a predetermined time or predetermined time interval;
- second sending means configured to send the first telephone number, the second telephone number, the SP indicator and the time associated with the forwarding of the reply message to a third database; and
- a second receiving means for receiving from the Service Control Point a message comprising the first telephone number, the second telephone number and an indication that the telephone call has been made.

The SCP in this case comprises

- trigger receiving means configured to receive from a proxy server a trigger message comprising two telephone numbers, said trigger message indicating a telephone call related to the two telephone numbers;
- the third database;
- first determining means configured to determine whether the two telephone numbers correspond to the first telephone number and the second telephone number stored associated with each other in the third database;
- second determining means configured to, if the two telephone numbers correspond to the first telephone number and the second telephone number, determine, based on a time difference between the time associated with the forwarding of the reply message and a time indicative of when the telephone call was made, whether the call has been made within the predetermined time or predetermined time interval from the forwarding of the reply message; and
- a message generator for generating and sending the message, if the telephone call related to the two telephone numbers correspond to the first telephone number and the second telephone number and has been made within the predetermined time or predetermined time interval.

The two call-tracking systems above may comprise an information header inserter configured to add in the request an information header with data indicating to the web server host that possible calls from the first UE to the second UE can be tracked by the call-tracking system.

The retrieving means may in the two call tracking systems above be configured to retrieve an ad identity from the reply message and the storing means may be configured to store the ad identity in the first database associated with the first telephone number, the second telephone number, the SP indicator and the time associated with the forwarding of the reply message. The call indicator in the two call-tracking systems may in that case be configured to store the ad identity in the second database together with the first telephone number, the second telephone number, the SP indicator and the time associated with the forwarding of the reply message, if the call has been made within the predetermined time or predetermined time interval.

The two call-tracking systems may comprise the first database and/or the second database.

The trigger message may in the two call-tracking systems be an IN (Intelligent Network) trigger and the SP indicator may be a URL of the SP.

Furthermore the invention relates to an HTTP proxy server computer program, which comprises computer readable code means which when run on an HTTP proxy server causes the HTTP proxy server to

- forward from a first UE associated with a first telephone number a web request for a web page to a web server host,
- receive in response to the request, a reply message comprising the web page and at least one second telephone number associated with a second UE, forwarding the reply message to the first UE, retrieve the first telephone number, the second telephone number, a time associated with the forwarding of the reply message to the first UE, and a SP indicator for a service provider associated with the web server host, store, associated with each other in a first database, the first telephone number, the second telephone number, the SP indicator and the time associated with the forwarding of the reply message to the first UE, receive from a proxy server a trigger message comprising two telephone numbers, said trigger message indicating a telephone call related to the two telephone numbers, determine whether the two telephone numbers correspond to the first telephone number and the second telephone number stored associated with each other in the first database, and, if the two telephone numbers correspond to the first telephone number and the second telephone number, determining, based on a time difference between the time associated with the forwarding of the reply message and a time indicative of when the telephone call was made, whether the call has been made within a predetermined time or predetermined time interval from the forwarding of the reply message, and, if the call has been made within the predetermined time or predetermined time interval, store information related to the call in the first database or a second database.

The HTTP proxy server computer program may comprise computer readable code means which when run on the HTTP proxy server causes the HTTP proxy server to insert in the request an information header with data indicating to the web server host that a call from the first UE to the second UE can be tracked by the HTTP proxy server.

The HTTP proxy server computer program may comprise computer readable code means which when run on the HTTP proxy server causes the HTTP proxy server to:

receive from the web server host an ad identity comprised in the reply message;

store the ad identity in the first database associated with the first telephone number, the second telephone number, the SP indicator and the time associated with the forwarding of the reply message; and if the call has been made within the predetermined time or predetermined time interval, store the ad identity in the second database together with the first telephone number, the second telephone number, the SP indicator and the time associated with the forwarding of the reply message.

The HTTP proxy server computer program may comprise computer readable code means which when run on the HTTP proxy server causes the HTTP proxy server to retrieve the second telephone number from an HTTP header of the reply message.

The HTTP proxy server computer program may comprise computer readable code means which when run on the HTTP proxy server causes the HTTP proxy server to retrieve the second telephone number from the web page.

The invention also relates to a computer program product comprising computer readable means and the HTTP proxy server computer program stored on the computer readable means.

Moreover the invention relates to a web server host adapted for communication with each one of the call-tracking systems. The web server host comprises message means configured to create and send to one of the two the call-tracking systems a reply message to a request for a web page from a first UE associated with a first telephone number forwarded by the call-tracking system, where the reply message comprises the web page with at least one second telephone number and an HTTP header comprising the second telephone number.

The web server host may comprise a header analyzer configured to determine if there in the forwarded request is data indicating that a call from the first UE to a second UE associated with the second telephone number can be tracked by the call-tracking system.

The invention also relates to another web server host adapted for communication with any one of the call-tracking systems. This web server host comprises:

message means configured to create and send a reply message to a, from the call-tracking system forwarded, request for a web page from a first UE associated with a first telephone number, said web-page comprising at least one second telephone number, a header analyzer configured to determine if there in the forwarded request is an information header with data indicating that a call from the first UE to a second UE associated with the second telephone number can be tracked by the call-tracking system, wherein the message means is configured to add an HTTP header comprising the second telephone number to the reply message only if it has been determined that the information header is present in the request.

The message means in each one of the web server hosts may be configured to insert an ad identity in the HTTP header or in a second HTTP header of the reply message.

Also, the invention relates to a web server computer program comprising computer readable code means which when run on a web server host causes the web server host to create and send to a call-tracking system a reply message to a request for a web page from a first UE associated with a first telephone number forwarded by the call-tracking system, where the reply message comprises the web page with at least one second telephone number and an HTTP header comprising the second telephone number.

The web server computer program may comprise computer readable code means which when run on the web server host causes the web server host to determine if there in the forwarded request is data indicating that a call from the first UE to a second UE associated with the second telephone number can be tracked by the call-tracking system.

The invention also relates to another web server computer program, which comprises computer readable code means which when run on a web server host causes the web server host to:

create and send a reply message to a, from the call-tracking system forwarded, request for a web page from a first UE associated with a first telephone number, said web page comprising at least one second telephone number;

determine if there in the forwarded request is an information header with data indicating that a call from the first UE to a second UE associated with a second telephone number can be tracked by the call-tracking system; and add an HTTP header comprising the second telephone number to the reply message only if it has been determined that the information header is present in the request.

The web server computer programs may comprise computer readable code means which when run on the web server host causes the web server host to insert an ad identity in the HTTP header or in a second HTTP header of the reply message.

Finally the invention relates to a computer program product comprising a computer readable means and one of the web server computer programs stored on the computer readable means.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
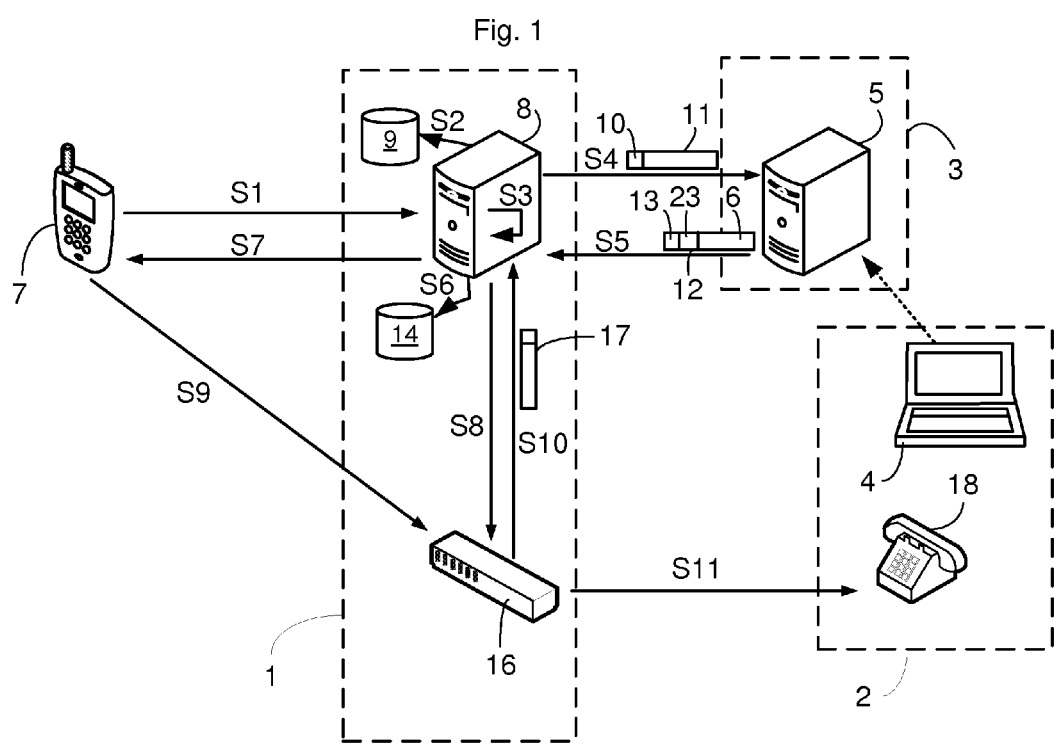
FIG. 1 illustrates network nodes and some steps involved in a first general embodiment according to the invention.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

The invention illustrated hereinafter with some embodiments allows the correlation of a main phone number in a web page displayed by a UE and a subsequent telephone call placed by the same UE to the main phone number. A telecommunications network operator can run this service as a value added service for an ad broker or a web site displaying the ad to allow the operator to track the success of the ad in question.

FIG. 1 shows a first general embodiment of the invention, which discloses a technical implementation for a telecommunications network operator 1 to take part in the Internet advertising value chain, without having to set up a system where temporary campaign telephone numbers have to be generated for an advertiser 2. The advertiser 2 is typically a company that wants to inform about a product or a service that they want to sell, but it can, for example, also be charities or non-profit organizations. The advertiser 2 is in contact with an SP 3; the contact here illustrated by a laptop 4 on the advertiser-side and an SP server in the form of a web server host 5. As indicated with a dashed arrow in FIG. 1 the advertiser 2 supplies a second telephone number, hereinafter in the description called B-number, of the advertiser 2 together with at least a part of ad content which should be shown via the SP 3. The SP 3 is responsible to the advertiser 2 to distribute the ad and/or make the ad or a link to the ad visible in a web page 6, where the ad could be the whole web page or a part of the web page. In one embodiment the web page 6, once displayed on a display on or under the control of a first UE 7, can comprise a list of search results and the ad adjacent to search results. The first UE 7 is here a device provided with a secure element in the form of a e.g. a SIM, ISIM (Internet Protocol Multimedia Services Identity Module) or USIM (Universal Subscriber Identity Module), and can typically be a mobile phone, PDA (Personal Digital Assistant) or laptop connectable via a wired or wireless access network (now shown) of a telecommunications network to the web server host 5, which typically is in or connected to a WAN (Wide Area Network), such as the Internet. At least some messages between the first UE 7 and the web server host 5 here have to pass a call-tracking system comprising an HTTP proxy server 8, as will be explained more in detail in conjunction with method steps illustrated with arrows S1-S10 of FIG. 1.

In a first step S1, the first UE 7, via a web browser installed in the first UE 7, makes a request for the web page 6 to a web server installed in the web server host 5, e.g. by sending an HTTP get message to the web server. An example of web pages are search result pages from a search engine, such as Google search at www.google.com and Microsoft Bing at www.bing.com, but it may of course be any web page, e.g. a newspaper web page, which comprises the ad or a link to the ad. Instead of the web browser, it should be understood that a browser installed in the first UE 7 may in another embodiment be a WAP (Wireless Application Protocol) browser that requests a web page via a WAP gateway (not shown).

In a second step S2 the request passes via the HTTP proxy server 8, e.g. due to a browser configuration as is well known to a person skilled in the art for forcing messages from all or some UE:s associated with the telecommunications network operator 1 to which the HTTP proxy server 8 belongs to be intercepted by the HTTP proxy server 8. Note that mapping between a first telephone number, hereinafter in the description called the "A-number", in the form of an MSISDN, and an IP (Internet Protocol) address associated with the first UE 7 has already been performed in a conventional manner, i.e. an authentication process, when the first UE 7 by starting the web browser sets up "Internet connectivity". The corresponding IP address and the A-number are stored associated to each other in a session database/access database 9, which in one embodiment is stored in a memory, e.g. in a RAM (Random Access Memory) in the HTTP proxy server 8 itself, but the session database may of course be hosted by another node connected to the HTTP proxy server 8.

In a third step S3 the HTTP proxy server 8 adds an information header 10 in the form of an HTTP header to the request. A purpose of the information header 10 is that this request can be tracked between web sessions and circuit calls. This information header 10 in one embodiment comprises a track indicator "x-trackable: true", but may of course indicate traceability in any way as agreed upon by the telecommunications network operator 1 and the SP 3.

In a fourth step S4 the now trackable request 11 comprising the information header 10 is forwarded as a new HTTP request based on the HTTP request from the first UE 7 to the web server host 5 from the HTTP proxy server 8, which in other words does not need to store anything related to the request other than the mapping between the IP-address and the A-number, but as is mentioned further down, the HTTP proxy server 8 may store additional information retrieved or associated with the received request from the first UE 7, such as the time when the request was received by the HTTP proxy server 8 and a URL of the SP 3.

In a fifth step S5 the request 11 is received by the web server host 5 and the web server host 5 replies with a reply message 12 comprising the web page 6, which in its turn comprises at least one B-number. In one embodiment of the fifth step S5 the web server host 5 also adds a new HTTP header 13 to the reply message 12. The HTTP header 13 comprises the at least one B-number. As an example the HTTP header 13 could comprise "x-phonenumber:+46107190000, +46107143499". In another embodiment of the fifth step S5, the reply message 12 is sent without the HTTP header 13.

In a sixth step S6 the reply message 12 is received by the HTTP proxy server 8, which then retrieves and stores three parameters associated with the reply message 12: a time associated with forwarding of the reply message 12 to the first UE 7, B-number(s) and an SP indicator associated with the service provider 3.

These three parameters can be stored in a first database 14, which also can be termed 'correlation database' and may be comprised in a memory, e.g. in the form of a RAM or a Flash memory, in the HTTP proxy server 8. The first database 14 may alternatively be comprised in another network node connected to the HTTP proxy server 8. The three parameters could also be stored in the session database 9, which thus can be said to be the first database according to the appended claims, but here in the description we have as a way of exemplifying the invention with different embodiments disclosed the first database 14 as a separate database. In embodiments comprising the first database 14, the A-number also has to be stored therein in association with the other three parameters. The A-number is retrieved by the HTTP proxy server 8 from the session database 9, e.g. by checking a source address in an IP-header in the request from the first UE 7 in step S1 and then looking up the A-number in the session database 9 with the help of the source IP address. In embodiments where the three parameters are stored in the session database 9, they have to be associated with the A-number already stored and associated with e.g. the source IP-address. In other words the time associated with forwarding of the reply message 12, the A-number, the B-number and the SP indicator should be stored associated with each other in the session database 9 or the first database 14. It is for the embodiments disclosed in the detailed description proposed an extensive use of RAM:s as the hosting memory for the first database 14 and the session database 9, and the parameters should therefore naturally be stored in a way suitable for such memories. However a person skilled in the art would acknowledge that the parameters could be stored associated with each other in several different ways known to a person skilled in the art, such as storing parameters in different fields of the same record in a flat, table model database or in a relational database.

The time associated with the forwarding of the reply message 12 to the first UE 7 can be retrieved by a time stamping or time checking function in the HTTP proxy server 8 according to any message time stamping method known to a person skilled in the art, e.g. any method that utilizes a CPU counter or any methods where a time is requested from another node. In such embodiments it is appropriate to log and store the approximate time when the reply message was received by the HTTP proxy server 8 or forwarded to the first UE 7 or even when the request from the first UE 7 was received by the HTTP proxy server 8. In another embodiment the time is the one mentioned in an HTTP header of the reply message 12 as the time when the reply message 12 was sent from the web server host 5, e.g. the typical Last-Modified data in an HTTP reply. It should be obvious from the embodiments above that the intention of 'the time associated with the forwarding of the reply message 12 to the first UE 7' is not only limited to the exact time when the reply message 12 actually is forwarded. It is generally sufficient for the purpose of this invention that the time deviation between the actual forwarding and the assessed time is as long as 1 minute, although it generally takes a much shorter time, of course in dependence of the size of the web page 6.

The SP indicator is any type of information which makes it possible to identify or find the SP 3 and may be e.g. an IP-address, an identity written in plain text or a URI (Uniform Resource Identifier) in the form of a URN (Uniform Resource Name) or a URL. Taking the URL as example, it can automatically be retrieved by the HTTP proxy server 8 already by looking in the request from the first UE 7 for a host name. A typical HTTP request received from the first UE 7 could be, for illustrative purposes only:

Get/somedir/searchresultpage.html HTTP/1.1
Host: www.searchandadvertisercompany1.com Another way of retrieving the URL is by reading the source IP-address of the reply and make an inversed DNS (Domain Name System) lookup. Still another way is to configure the web server host 5 to add an additional header comprising the URL of the SP 3 in the reply message 12. The reason to store also the SP indicator is to enable the HTTP proxy server 8, or the owner of the HTTP proxy server 8, to more conveniently communicate with the SP 3 and/or transmit statistical reports associated with the ad to the SP 3 via e.g. messages to the web server host 5 or another device owned by the SP 3.

In the embodiment where the web server host 5 creates the HTTP header 13 in step S5, the B-number(s) are retrieved from the HTTP header 13. In the embodiment where no new HTTP header is created, the HTTP proxy server 8 retrieves the B-number by scanning the web page 6 in search of telephone numbers, i.e. B-numbers, by utilization of e.g. a text/ number recognition function. This embodiment naturally generally demands much more processing power of the HTTP proxy server 8 and generally also causes prolonged response times than the embodiment where the HTTP proxy server 8 just have to read a certain field in the HTTP header 13. To limit the number of scanned web pages, the HTTP proxy server 8 may comprise a checking unit 37 (see FIG. 6) that compares the source IP-address of the reply with a list of IP-addresses associated with SP:s with which the owner of the HTTP proxy server 8 has a call-tracking agreement.

In a seventh step S7 the web page 6 is sent from the HTTP proxy server 8 to the first UE 7, which presents the web page 6 to a user, which thereby can look at the ad, e.g. via the display of the first UE 7, and see the B-number(s) of the ad.

In an optional eighth step S8, a notifier 15 (see FIG. 6) comprised in the HTTP proxy server 8 causes the HTTP proxy server 8 to send a notification to a proxy server 16. The notification comprises in one embodiment of this eighth step S8 the A-number and the purpose is to notify the proxy server 16 that a trigger message 17 shall be sent to the HTTP proxy server 8 from the proxy server 16 if the first UE 7 makes a call via the proxy server 16. In another embodiment of the eighth step S8, the B-number is comprised in the notification, meaning that every call to the B-number shall initiate the trigger message 17. As will become obvious further down, this eighth step S8 is intended to decrease the communication between the proxy server 16 and the HTTP proxy server 8 in comparison with other embodiments without the eighth step S8. The notification can be e.g. an SS7 (Signalling System 7) message.

After a while the first UE 7 makes a call to the B-number. This is seen as a ninth step S9 in FIG. 1. Here the call is illustrated as being transmitted via the proxy server 16 between a PLMN (Public Land Mobile Network) associated with the first UE 7 and a PSTN (Public Switched Telephone Network) to which a second UE 18 associated with the B-number is connected. In other words the first UE 7 makes a circuit call to the B-number via the proxy server 16, which for example can be an MSC (Mobile Switching Center) for a GSM (Global System for Mobile communications) or UMTS (Universal Mobile Telecommunications System) network.

For the purpose of this invention the proxy server 16 comprises a function for sending the trigger message 17 comprising the A-number and the B-number to the HTTP proxy server 8 when the A-number calls the B-number. The function is in this embodiment an SSF (Service Switching Function) for IN communication with the HTTP proxy server 8 based on SS7 as is known as such. Another term used in the art for the SSF is SSP (Service Switching Point), but SSF will be used hereinafter. In a tenth step S10 the SSF causes the proxy server 16 to send the trigger message 17 in the form of an IN-trigger comprising the A-number and B-number to the HTTP proxy server 8 when the first UE 7 calls the second UE 18, but it could of course in other embodiments be another message format which is not SS7. As will become obvious further down, the IN-trigger may also comprise a time indicative of when the call was made. As initially discussed above in conjunction with the eighth step S8, a trigger message could be sent for all calls via the proxy server 16, but in order to reduce network load, the proxy server could be provided with information from the HTTP proxy server 8 in order to only send the trigger message 17 in some cases, such as when the first UE 7 call somebody, or when somebody calls a device, such as the second UE 18, associated with the B-number. The proxy server 16 could in an alternative embodiment be configured to only send the trigger message 17 when the A-number is used for calling the B-number, but that requires the notification to comprise both the A-number and the B-number and an additional database in the proxy server 16.

In an eleventh step S11 the second proxy server 16 enables the call to be forwarded to the B-number. The eleventh step S11 naturally may be performed before or at the same time as the tenth step S10.

Figure 2:
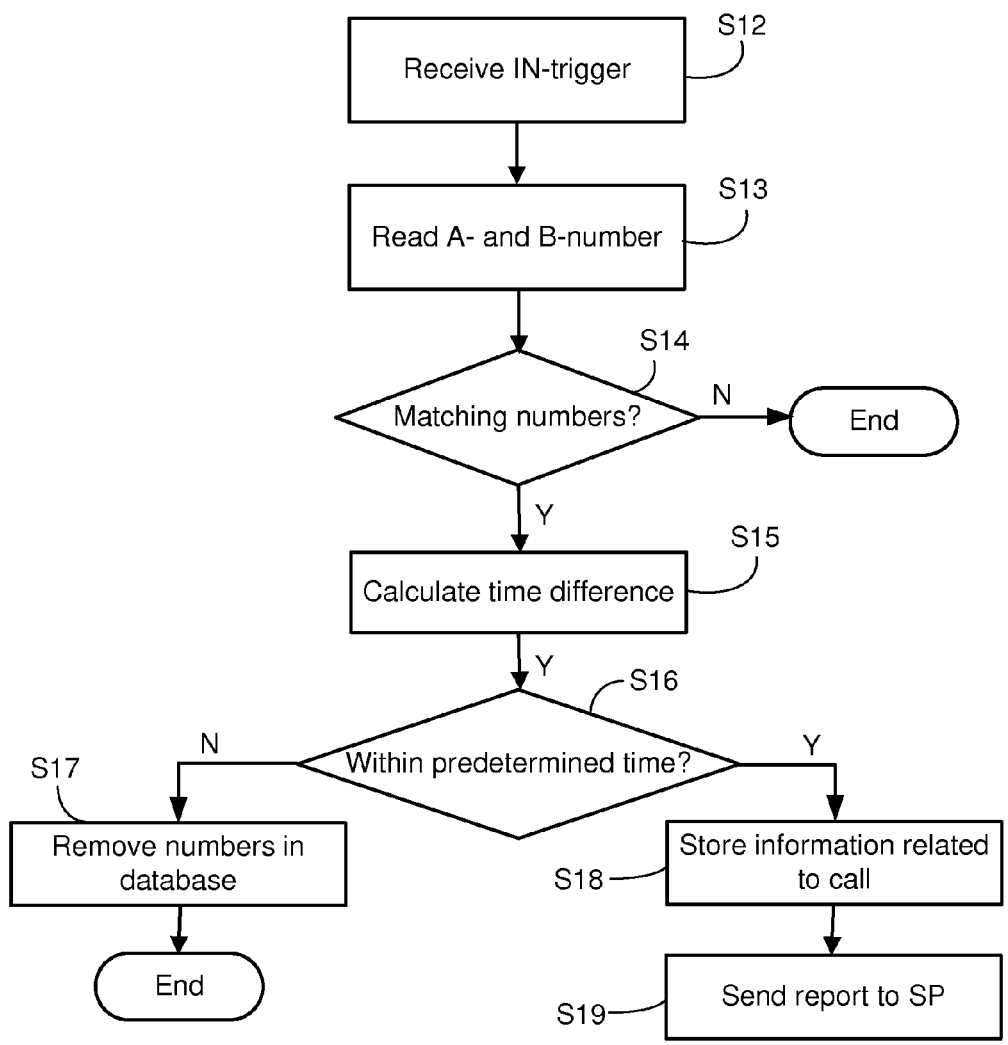
FIG. 2 is a flow chart illustrating other steps described with respect to the first general embodiment.

In a twelfth step S12, which is illustrated in FIG. 2, the HTTP proxy server 8 receives the IN-trigger.

In a thirteenth step S13 a first application, here an IN application, in the form of an HTTP proxy server computer program 19 (see FIG. 8) installed and run by the HTTP proxy server 8 causes the HTTP proxy server 8 to read the A-number and the B-number in the IN-trigger.

In a fourteenth step S14 the IN application causes the HTTP proxy server 8 to compare this number-pair, i.e. the two received telephone numbers in the IN-trigger, with number-pairs already stored in the session database 9 or the first database 14, i.e. dependent on embodiment number-pairs are stored in the session database 9 or the first database 14 as explained above. If there is a matching pair in the session database 9 or first database 14 respectively, the application causes the HTTP proxy server 8 to continue with a fifteenth step S15 where a time difference is calculated between the time indicative of when the call was made and the stored time associated with the A- and B-number pair in the session database 9 or the first database 14. As stated above, the time indicative of when the call was made can be retrieved from the IN-trigger. The time comprised in the IN-trigger can as such be the time when the call was received or forwarded by the second proxy server 8 or the time when the IN-trigger was sent. Furthermore, the time may not have to be sent in the IN-trigger; the time may alternatively be a time when the IN-trigger is received by the HTTP proxy server 8. In other words the actual, exact point of time when the call was placed does not have to be used. It is sufficient that the time associated with the time when the call was made is accurate enough for the object of the invention to be fulfilled.

Figure 8:
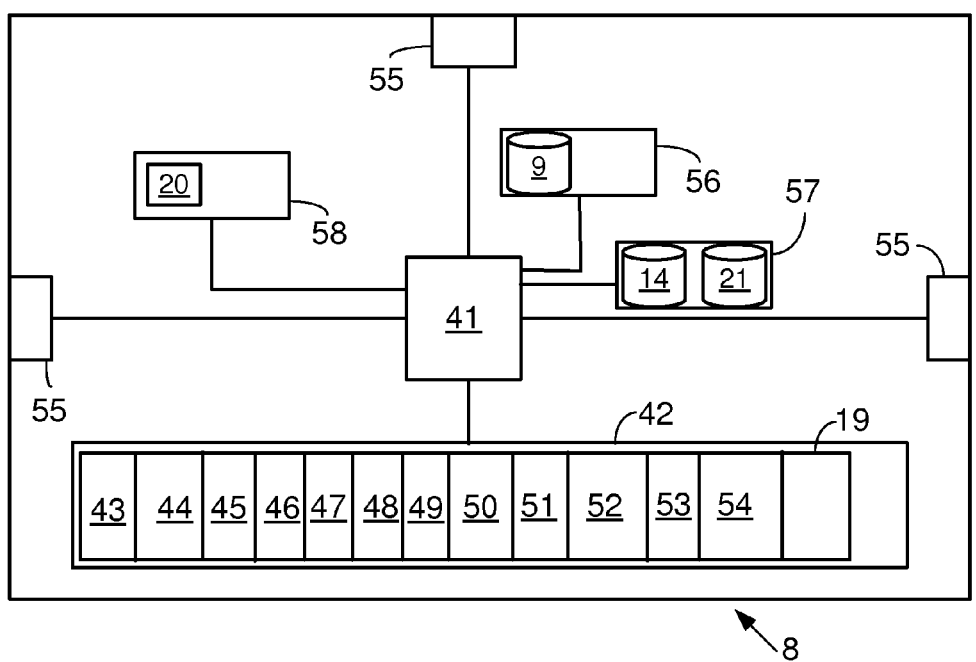

In a sixteenth step S16 the time difference is compared with at least one predetermined time value 20 (see FIG. 8). In the embodiment disclosed in conjunction with FIG. 2 there is only one time value 20, and it is here generally a question of whether the time difference is below or above the time value 20. If the time difference is above the time value, the call is being deemed as not being related to the ad. In such a case the HTTP proxy server 8 may just end the processing associated with the IN-trigger. However, in the embodiment shown in FIG. 2, if it is found in the sixteenth step S16 that the time difference is larger than the time value, then the application causes the HTTP proxy server 8 in a seventeenth step S17 to remove the record comprising the number-pair and the associated time and SP indicator in order to avoid the steps S15 and S16 in the future. Also, the seventeenth step S17 may comprise a step of sending a second notification from the HTTP proxy server 8 to the proxy server 16 in order to notify the proxy server 16 that trigger messages does not have to be sent any more with respect to at least one telephone number, e.g. the A-number. The actual content of the second notification of course depends on the embodiments discussed in the eighth step S8 and the tenth step 510.

Even if there is only one time value 20 in the exemplary sixteenth step S16 above, there may in other, more sophisticated embodiments be several different time values with which the time difference is compared in order to determine a certain time interval in which the call has been made.

Figure 6:
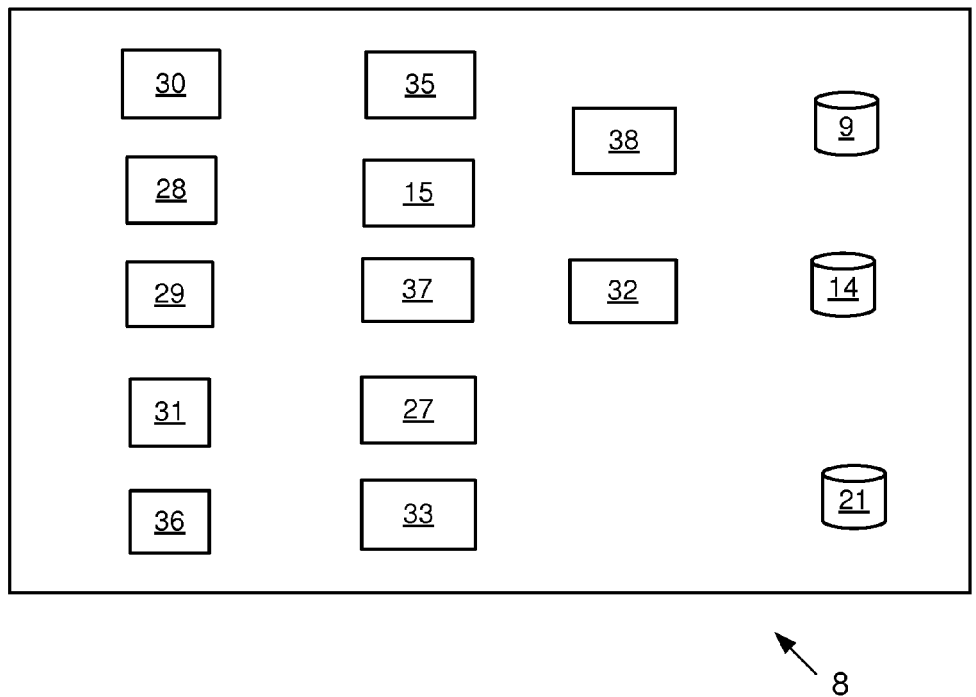

If the answer is 'yes' in the sixteenth step S16, i.e. the time difference is smaller than the time value 20, the call is considered as being an action initiated by the ad that has been shown to the user of the first UE 7. Therefore, in an eighteenth step S18, the HTTP proxy server 8 stores information related to the call by logging the call as being 'successful', i.e. being a call related to the ad from the owner of the B-number, in a database. The database used for storing log records could be the session database 9, the first database 14 or a second database 21, here called a correlation database which accordingly could be the correlation database mentioned above and which is used for retrieving reports, e.g. statistical reports, related to a certain advertiser. The second database 21 could as is shown in FIGS. 6 and 8 be hosted by the HTTP proxy server 8, but may of course be hosted by another device connected to the HTTP proxy server 8. The actual design of the correlation database and what further information that is suitable in the log records other than B-numbers and an indicator of one or more successful calls related to the B-numbers may of course be done in numerous ways depending on what kind of information the SP desires from the owner of the HTTP proxy server 8. However, one way of designing the correlation database, if it is the second database 21, is to store a record with a B-number and a counter value, which counter value shows how many successful calls that have been made to the B-number. Upon request from the SP 3, e.g. from the web server host 5, said request comprising a B-number, the HTTP proxy server 8 may just return the counter value associated with the B-number in the correlation database. A more sophisticated logging of successful calls may comprise record fields in the correlation database for the A-number, the time when the call was made (or when the IN-trigger was sent by the proxy server 16 or received by the HTTP proxy server 8), the length of the call and an indicator showing that the advertiser really answered the call, or that the second UE 18 returned a busy signal or that the advertiser 2 was unable to answer the call. Such a more sophisticated logging naturally requires more messages between the proxy server 16 and the first application in the HTTP proxy server 8. The web server host 5 may for the purpose of receiving reports comprise report requesting means 22 (see FIG. 10) for, for example, at regular time intervals, request statistical reports associated with a certain ad, via at least one B-number associated with the ad, from the HTTP proxy server 8. A report sent, illustrated in FIG. 2 as a nineteenth step S19, from the HTTP proxy server 8 to the SP 3 can thereby be used as a basis for the owner of the HTTP proxy server 8 to charge the SP 3 in dependence of a business agreement and for the SP 3 to charge the advertiser 2 according to another business agreement dependent on how successful the ad via the channel provided by the SP 3 has been. The actual business agreements/charging models are out of the scope of this invention, but they could of course be of any known kind where the output of the correlation database to the SP 3 is appropriate, e.g. charging being directly proportional to the number of successful calls. In a case where there are multiple time values to compare with in the sixteenth step S16, the business agreement between the SP 3 and advertiser 2 could be to pay one fee for every call made within a certain, smaller time value, and a reduced fee for every call made between the smaller time value and a larger time value.

Instead of being triggered by the SP 3, e.g. via the web server host 5, to send reports, the reporting can be made instantaneously via the HTTP proxy server 8 or at a later point of time in batches for each B-number separately or more than one B-number. If an SP 3 can say to an advertiser that within five minutes after a visit to the web page a call has been placed, then it is likely that the phone number has been seen on the web site. If the call is placed after a long time, i.e. after the time value 20 mentioned in conjunction with the sixteenth step S16 above, the caller can be deemed to have seen the B-number in some other place.

The HTTP proxy server 8 can for example be the Ericsson MSP (Multi Service Proxy) which in one embodiment belongs to an access network operator and/or a core network owner. The Ericsson MSP is an IPv6 ready, multi-purpose, multi-technology network node that can be deployed in mobile or fixed environments and is a link between a wireless or fixed core network and the Internet. Applications for which the Ericsson MSP typically is used are value added services and mobilizing web content.

It should be noted that S3 is not a mandatory step according to the invention. The information header 10 and the track indicator therein do not have to be linked to any of the other steps performed in the steps discussed in conjunction with FIGS. 1 and 2. It is up to the SP 3 to decide whether the information header 10 should be used for further actions, such as being used to indicate that the HTTP header 13 mentioned in the fifth step S5 shall be created. In such a case it is avoided that the new HTTP header 13 is created for every web page sent from the web server host 5. Another way of using the track indicator is to use it to alert the SP 3 that an ad for which call-tracking could be used, has been sent to a potential customer of the advertiser 2, thus initiating the SP 3 to request a report from the owner of the HTTP proxy server 8 in a manual or automatic way at a later point of time. The track indicator even makes it possible for the SP 3 to make its own report independently of the reports from the owner of the HTTP proxy server 8.

It is also realized that the advertiser 2 may provide the SP 3 with more than one ad, where all the provided ads comprise the same B-numbers. In such a situation the advertiser 2 may be interested in which ones of the provided ads that were more successful than others. In order to solve this problem, an identity of each ad can be used and logged in the following manner. In the embodiment of the fifth step S5 where the HTTP header 13 is added, the web server host 5 also includes in the HTTP header 13 an ad identity of the ad related to the B-number shown in the ad. The ad identity could be any kind of identity which enables the SP 3 to identify the ad. In other words it could just be a number set by the SP 3 and inserted in the new HTTP header 13 as e.g. "x-adid:0000003" or something more indicative of the advertiser 2, such as "x-adid: advertiser7-000001". The ad identity could not only be set by the SP 3, but could be a reference number etc. originally received from the advertiser 2 in order to facilitate subsequent communication, e.g. business related discussions, between the advertiser 2 and the SP 3 about the ad. For such a purpose the ad identity could also comprise two references, both a reference of the SP 3 and a reference of the advertiser 2. Accordingly also the ad identity in the HTTP header 13 is retrieved and stored associated with the other stored parameters by the HTTP proxy server 8 in the first database 14 or the session database 9, dependent on embodiment as mentioned above with respect to the sixth step S6. Furthermore the ad identity is stored by the HTTP proxy server 8 in the eighteenth step S18 in the same database as the other information stored therein in the eighteenth step S18. Moreover the ad identity may suitably be included in the report sent to the SP 3 in the nineteenth step S19, thereby enabling assessment not only of successful calls based on ads from a particular advertiser, but also the success of different ads for the advertiser. Although the HTTP header 13 has been mentioned as the carrier of the ad identity in the reply message 12, the ad identity may be comprised in a new, second HTTP header 23 of the reply message 12.

The URL of the actual web-page 6 could also be suitable to store in the fifth step S5 and in the eighteenth step S18 associated with the other parameters in order to be able to monitor the popularity of different web pages, thereby opening up for further charging models between especially the SP 3 and the advertiser 2. As illustrated above, the URL of the web-page 6 can be retrieved from the request made in the first step S1 from the first UE 7.

Figure 3:
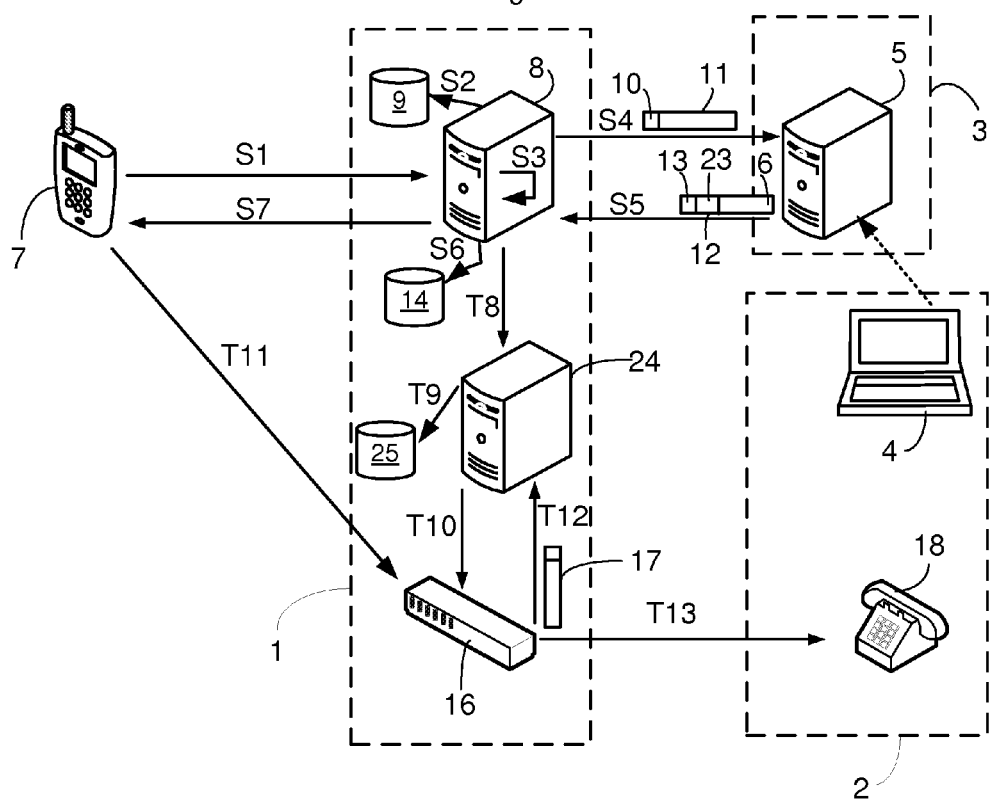
FIG. 3 illustrates network nodes and some steps involved in a second general embodiment of the invention.

FIG. 3 describes a second general embodiment with many similarities with the first general embodiment described above, including all alternatives described above which the person skilled in the art would realize fits well with the second general embodiment. The steps S1-S7 above are also applicable to this embodiment. The difference is, node-wise, that according to known IN-architecture, an SCP (Service Control Point) 24 is introduced between the proxy server 16 and the HTTP proxy server 8 and in addition to the HTTP proxy server 8 is a part of the call-tracking system. The SCP 24 is known as a node as such for a person skilled in the art of IN and is therefore not described more in detail with respect to all features of the SCP 24 that are already known.

FIG. 3 also illustrates steps made in the embodiment of FIG. 3, after the seventh step S7 has been performed. Here, in an eighth step T8 the HTTP proxy server 8 sends the A-number, B-number and time retrieved and stored in the sixth step S6 to the SCP 24. The SP indicator may also be sent to the SCP 24, but it is optional.

In a ninth step T9 the SCP 24 receives and stores the information in a third database 25 in or connected to the SCP. In other words, the third database 25 is an additional database for storing of the A-number, B-number and the time as already stored in the sixth step S6 in the session database 9 or the first database 14.

In an optional tenth step T10 corresponding to the eighth step S8 shown in FIG. 1, the notifier 25, here comprised in the SCP 24 (see FIG. 7), causes the SCP 24 to send the notification to the proxy server 16, for example as an SS7 message. The notification is thus received by the proxy server 16 and triggering based on the notification can now be performed by the proxy server 16.

After a time, in an eleventh step T11, the first UE 7 makes a call to the B-number in the same way as in the step S9 above, i.e. via the proxy server 16. In a twelfth step T12 the trigger message 17 is sent not to the HTTP proxy server 8, but to the SCP 24 and in a thirteenth step T13 corresponding to the eleventh step S11 of FIG. 1 the proxy server 16 forwards the call to a UE associated with the B-number via e.g. a PBX (Private Branch Exchange), in this case to the second UE 18. In a fourteenth step T14, illustrated in FIG. 4, the SCP 24 receives the trigger message 17, here in the form of an IN-trigger.

In a fifteenth step T15 a second application 26 (see FIG. 9), i.e. an IN application in the form of a computer program installed and run by the SCP 24 causes the SCP 24 to read the A-number and the B-number in the trigger message 17.

In a sixteenth step T16, the second application 26 causes the SCP 24 to compare the number-pair, i.e. the A-number and the B-number, from the trigger message 17 with number-pairs already stored in the third database 25. If there is a matching pair in the third database 25, the second application 26 causes the SCP 24 to continue with a seventeenth step T17 where the time difference is calculated between the time associated with the trigger message 17 and the stored time associated with the A- and B-number pair in the third database 25.

In an eighteenth step T18 the SCP 24 compares the time difference with the at least one predetermined time value 20. Just like in the embodiment disclosed in conjunction with FIG. 2 there is here, for exemplifying purposes only, one time value 20. If the time difference is above the time value, the call is being deemed as not being related to the ad. In such a case the SCP 24 may just end the processing associated with the trigger message 17. However, just like in the embodiment shown in FIG. 2, if it is found in the eighteenth step T18 that the time difference is larger than the time value, then the second application causes the SCP 24 to, in an nineteenth step T19, remove the record comprising the number-pair and the associated time in the third database 25 in order to avoid the steps T17 and T18 in the future for the same number-pair sent from the HTTP proxy server 8 to the SCP 24, at least until the same number-pair and a new time associated with the forwarding of a new reply message with the B-number is sent to the first UE 7.

In an optional twentieth step T20 the SCP 24 sends a message to the HTTP proxy server 8 that the record has been removed in the third database 25. Hence the HTTP proxy server 8 may use this information to delete the corresponding record in the corresponding correlation database, i.e. in the session database 9 or the first database 14 dependent on embodiment. This optional twentieth step T20 is not only optional because it increases the load on a telecommunications network, but also due to the fact that both an SCP 24 and an HTTP proxy server 8 generally have an internal clock function as mentioned in step S6 and therefore may be configured to at regular time intervals check the times stored in the session database 9 or the first database 14 and delete records for which a preset time has been passed.

If the answer is 'yes' in the eighteenth step T18, i.e. the time difference is smaller than the time value 20, the call is considered as being an action initiated by the ad having been shown to a user of the first UE 7. Therefore, in a twenty-first step T21, the SCP 24 sends a message to the HTTP proxy server 8 comprising at least the A-number, B-number and an indication that a 'successful' call has been made. The indication does not have to be certain indication information embedded in the message, but it can be the message itself. As should be obvious from the description above in conjunction with FIGS. 1 and 2, the message may also comprise other information retrieved by the SCP 24 in cooperation with the proxy server 16, such as the time associated with when the call was made and the length of the call.

Figure 4:
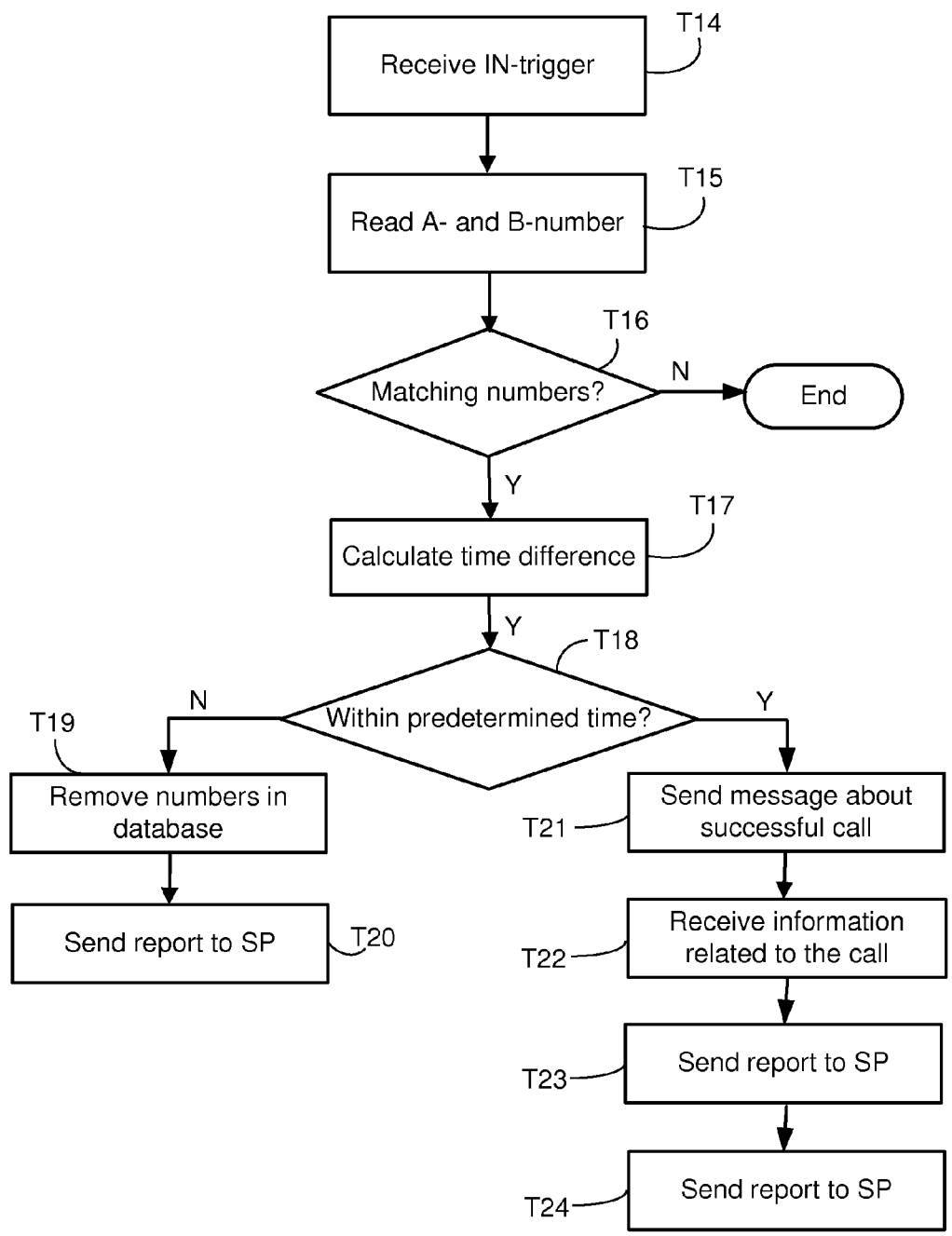
FIG. 4 is a flow chart illustrating other steps described with respect to the second general embodiment.

In a twenty-second step T22 the HTTP proxy server 8 receives the message sent by the SCP in step T21. FIG. 4 furthermore illustrate a twenty-third step T23 and a twenty-fourth step T24 which correspond to the eighteenth step S18 and the nineteenth step S19 respectively of the embodiment shown and discussed in conjunction with the first general embodiment. It should for example be understood that the use of the ad identity is equally applicable to the second general embodiment.

Figure 5:
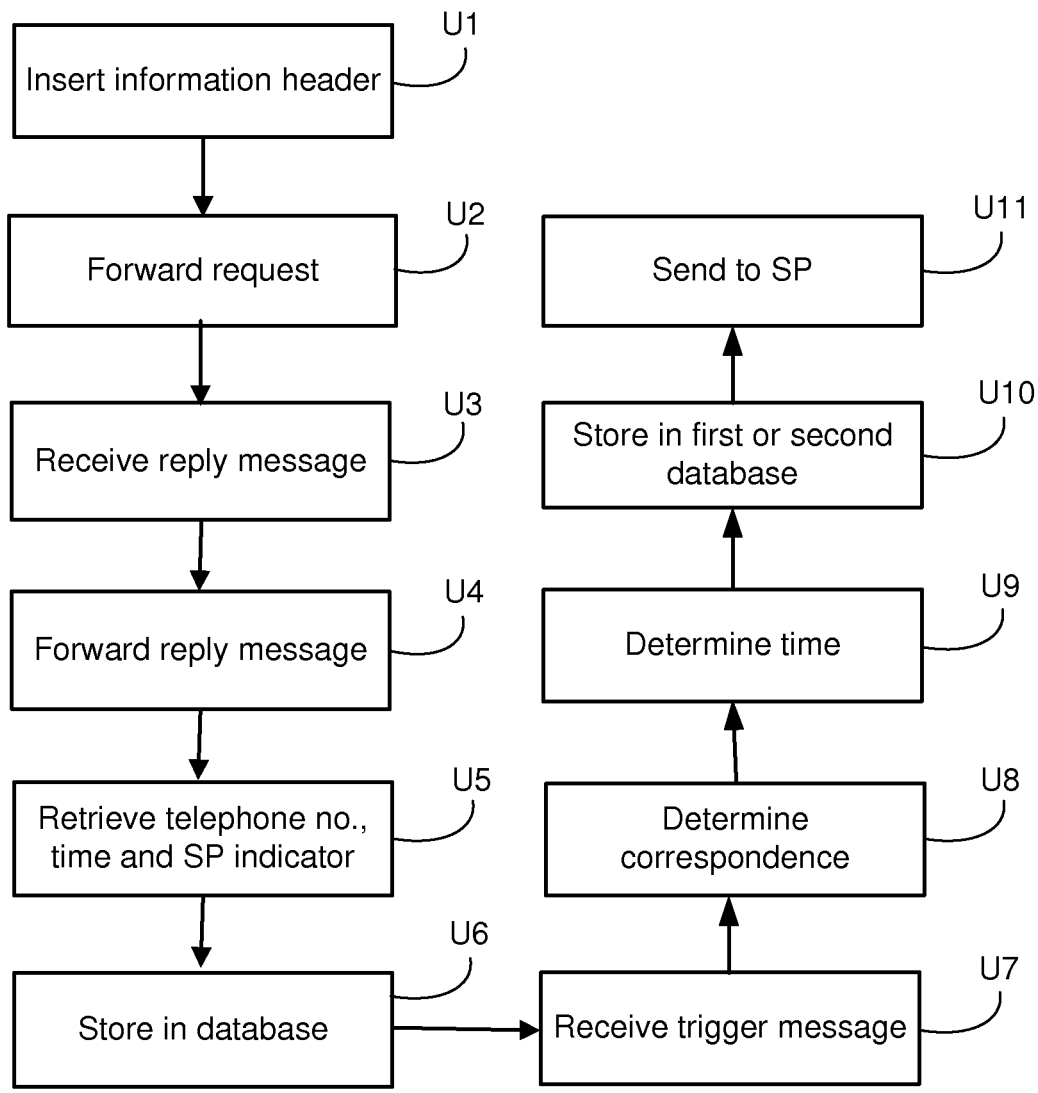
FIG. 5 is a flow chart illustrating an embodiment of a method for a call-tracking system, FIG. 6 schematically shows an embodiment of an HTTP proxy server, FIG. 7 schematically illustrates a call-tracking system in the form of an HTTP proxy server and an SCP, FIG. 8 schematically illustrates another embodiment of the HTTP proxy server, FIG. 9 schematically illustrate an embodiment of a call-tracking system, FIG. 10 schematically shows an embodiment of a web server host, and FIG. 11 schematically shows another embodiment of the web server host.

Having described two general embodiments together with several specific alternatives within these two general embodiments, a method common to both the general embodiments of the call-tracking system now will be described in conjunction with FIGS. 5-7. The method can in other words be performed in an embodiment where the call tracking system is the HTTP proxy server 8 or the HTTP proxy server 8 in combination with the SCP 24.

In an optional first step U1, an information header inserter 27 in the HTTP proxy server 8 adds in the request to be forwarded to the web server host 5 the information header 10. This step corresponds to step S3 above.

In a second step U2, sending means 28 of the HTTP proxy server 8 forwards the request from the first UE 7, optionally comprising the information header 10. This step corresponds to step S4 above.

In a third step U3, receiving means 29 of the HTTP proxy server 8 enables the HTTP proxy server 8 to receive in response to the request the reply message 12 from the web server host 5.

In a fourth step U4, the sending means 28 causes the HTTP proxy server 8 to forward the reply message 12 to the first UE 7. This step corresponds to step S7 above.

In a fifth step U5, which naturally may be performed before, 'simultaneously' or after step U4, retrieving means 30 of the HTTP proxy server 8 retrieves the A-number, the B-number, the time associated with the forwarding of the reply message 12 to the first UE 7 and the SP indicator. Optionally also the ad identity is retrieved by the retrieving means 30 from the reply message 12.

In a sixth step U6, the parameters/data retrieved by the retrieving means 30 in the fifth step U5 is stored associated with each other with the help of storing means 31 comprised in the HTTP proxy server 8. As stated above the parameters can be stored in the first database 14 or in the session database 9, which in FIGS. 6 and 7 are illustrated as being comprised in the HTTP proxy server 8. Optionally also the ad identity is stored associated with the other parameters by the storing means 31. The steps U3, U5 and U6 correspond to step S6 above.

In a seventh step U7, trigger receiving means 32 receives from the proxy server 16 the trigger message 17. This step corresponds to step S12 and step T14 respectively, and the trigger receiving means 32 is accordingly comprised in the HTTP proxy server 8 in the embodiment of FIG. 6 and in the SCP 24 in FIG. 7.

In an eighth step U8, first determining means 33 determine whether two telephone numbers comprised in the trigger message 17 correspond to the stored A-number and the B-number. In the embodiment of FIG. 6, the first determining means 33 is comprised in the HTTP proxy server 8. In the embodiment of FIG. 7 the first determining means 33 is comprised in the SCP 24, and here the A-number and B-number are stored in the third database 25 also comprised in the SCP 24. This step corresponds to step S14 and T16 respectively. In the embodiment of FIG. 7, the HTTP proxy server 8 for this purpose comprises second sending means 34 configured to send the A-number, the B-number and the time associated with the forwarding of the reply message 12 to the third database 25 as discussed with respect to the step T8 in FIG. 3. Optionally also the SP indicator and/or the ad identity may be sent to the third database 25 with the help of the second sending means 34.

In a ninth step U9, second determining means 35 determines whether or not the call has been made within a predetermined time, e.g. within a time determined by the time value 20 or a predetermined time interval from the forwarding of the reply message 12, if the telephone numbers in the trigger message 17 correspond to the stored A-number and the B-number. The second determining means 35 is comprised in the HTTP proxy server 8 in the embodiment of FIG. 6, but comprised in the SCP 24 in the embodiment of FIG. 7. The determination performed by the second determining means 35 may be done as mentioned in steps S15-S16 and T17-T18 respectively.

In a tenth step U10, a call indicator 36 comprised in the HTTP proxy server 8 stores information related to the call in the session database 9, first database 14 or the second database 21 dependent on embodiment described above, if the call has been made within the predetermined time or predetermined time interval. The call indicator 36 may optionally store the ad identity together with the information related to the call, i.e. the A-number, B-number, SP indicator and the time associated with the forwarding of the reply message, as well as optional information such as the length of the telephone call. The second database 21 is in the shown embodiments of FIGS. 6-7 comprised in the HTTP proxy server 8.

In an optional eleventh step U11, a report generator 38 comprised in the HTTP proxy server 8 sends a report with the call related information stored in the tenth step U10.

The call-tracking system according to the embodiment shown in FIG. 7 also comprises a second receiving means 39 in the HTTP proxy server 8 for receiving from the SCP 24 the message comprising two telephone numbers and an indication that the telephone call has been made according to the step T22 above. The message, which is generated and sent in the step T21 above if the telephone call related to the two telephone numbers correspond to the A-number and B-number and has been made within the predetermined time or predetermined time interval, is generated by a message generator 40 comprised in the SCP 24.

As should be readily understood by the skilled person, each one of the means/units mentioned above in conjunction with FIGS. 5-7, i.e. the report generator 38, the storing means 31, the retrieving means 30, the information header inserter 27, the checking unit 37, the sending means 28, the second sending means 34, the receiving means 29, the second receiving means 39, the call indicator 36, the message generator 40, the first determining means 33, the second determining means 35, the notifier 15 and the trigger receiving means 32, can be implemented in the call tracking system as special purpose hardware circuits such as ASICs (Application Specific integrated Circuits) or as a combination of at least one computer program and at least one processor in the HTTP proxy server 8 and, in the case of the embodiment shown in FIG. 7, the SCP 24. FIG. 8 schematically shows one example of an embodiment of the HTTP proxy server 8 where the means/units mentioned in conjunction with FIG. 6 are implemented as a first processor 41, e.g. a microprocessor, and the HTTP proxy server computer program 19 adapted to be run by the first processor 41. The HTTP proxy server computer program 19 is here stored on a first computer program product 42 in the form of a first memory comprised in the HTTP proxy server 8. The HTTP proxy server computer program 19 here comprises computer program modules corresponding to the means/units disclosed in FIG. 6, so that the computer program modules when run by the first processor 41 provides the means/units disclosed in conjunction with FIG. 6. In other words, the HTTP proxy server computer program 19 comprises a report generator module 43, a retrieving module 44, a sending module 45, a receiving module 46, a storing module 47, a call indicator module 48, a trigger receiving module 49, a first determining module 50, a second determining module 51, a notifier module 52, a checking module 53, and an information header inserter module 54. The first computer program product can here be a non-volatile memory in the form of a hard disk, a flash memory, a ROM (Read-only memory), a non-volatile RAM, a Compact Disc or a DVD, but it may of course be a volatile RAM wherein the HTTP proxy server computer program 19 have been loaded for execution by the first processor 41.

The HTTP proxy server 8 here also of course comprises input/output ports/circuits 55 for wired or wireless communication with the SCP 24, the web server host 5 and UE:s via a telecommunications network. Examples of such input/output ports are a typical wired Ethernet connector and an optical connector and an example of a circuit for wireless communication is an IEEE 802.11 compatible transceiving circuit. Furthermore the HTTP proxy server 8 here comprises a second memory 56 for storing the session database 9. A third memory 57 in which the first database 14 and the second database 21 are stored is also comprised, but it shall be understood that the databases 9, 14 and 21 all may be comprised in any one of the first, second and third memory. It shall also be understood that especially the session database 9 may be comprised in a cache memory of the first processor 41.

The time value or time intervals used in step S16 above may of course be stored as a part of the HTTP proxy server computer program 19, or as separate data in the first memory, but may optionally be comprised in another memory in order to be more easily edited. The time value/time intervals therefore are here illustrated as being stored in a fourth memory 58, which may be e.g. a flash memory, EEPROM (Electrically Erasable Programmable ROM) or a RAM.

FIG. 9 correspondingly discloses an example of the call tracking system in the form of the HTTP proxy server 8 and the SCP 24 as shown in FIG. 7, where the means disclosed in FIG. 7 here in FIG. 9 are implemented with the help of computer programs and processors. The HTTP proxy server computer program 19 here comprises the report generator module 43, the retrieving module 44, the sending module 45, the receiving module 46, the storing module 47, the call indicator module 48, the information header inserter module 54, the checking module 53, a second receiving module 59 and a second sending module 60. The second memory 56 here comprises the session database 9 and the first database 14, but the databases may of course be stored in a different way as explained above. The SCP 24 comprises a second processor 61, e.g. a microprocessor, connected to input/output ports/circuits 62 for communication with the proxy server 16 and the HTTP proxy server 8. The second processor 61 is also connected to a second computer program product 63 in the form of a fifth memory. The second application 26, here in the form of an IN application, comprises the trigger receiving module 49, the first determining module 50, the second determining module 51, the notifier module 52 and a message generator module 64, which modules correspond to the trigger receiving means 32, the first determining means 33, the second determining means 35, the notifier 15 and the message generator 40 respectively and which when run on the second processor 61 realize the means/units disclosed in FIG. 7. The second computer program product 63 can here be a non-volatile memory in the form of a hard disk, a flash memory, a ROM (Read-only memory), a non-volatile RAM, a Compact Disc or a DVD, but may of course be a volatile RAM when the second application 26 is run by the second processor 61. The third database 25 is here shown as being stored in a sixth memory 65 and the time value 20 or time intervals used in step T18 above may of course be stored as a part of the second application 26, or as separate data in the sixth memory 65, but may optionally be comprised in another memory in order to be more easily edited, such as a separate seventh memory 66 in the SCP 24.

Figure 10:
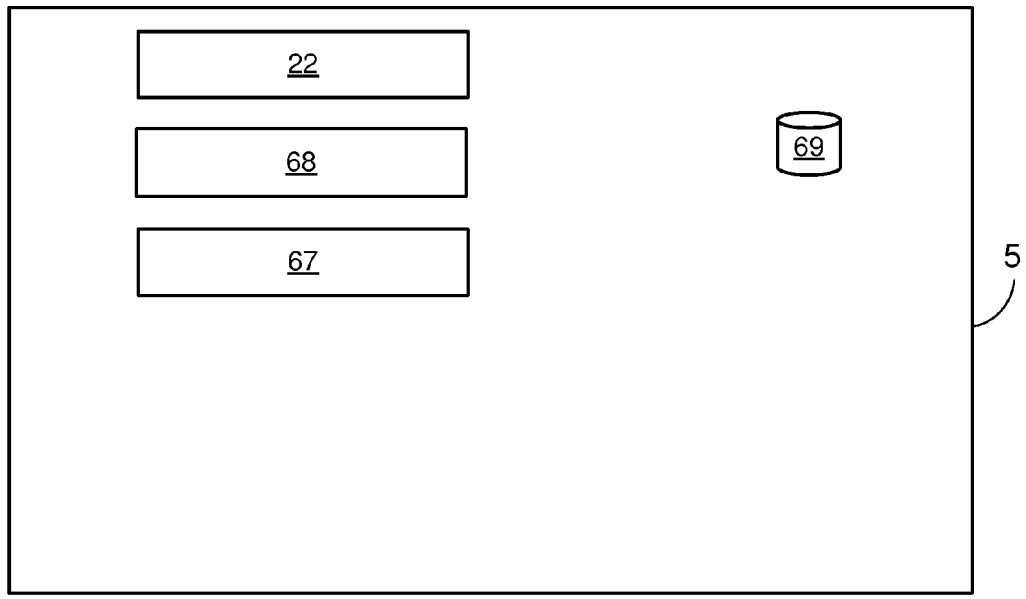

FIG. 10 schematically illustrates an embodiment of the web server host 5, here comprising message means 67 which enables the web server host 5 to create and send the reply message 12 to the call-tracking system, which reply message 12 comprises the web page 6 with at least one B-number and the HTTP header 13 with the B-number. Optionally the message means 67 is adapted to also add the second HTTP header 23 with the ad identity in the reply message 12. An optional header analyzer 68 configured to determine if the forwarded request comprises the information header 10 with data indicating that a call from the first UE 7 to a B-number can be tracked by the call-tracking system. The message means 67 may furthermore be configured to only add the HTTP header 13 and/or the second HTTP header 23 only if the header analyzer 68 has determined that the information header 10 is present in the request 11. An optional fourth database 69 comprising ad identities is here comprised in the web server host 5.

Figure 11:
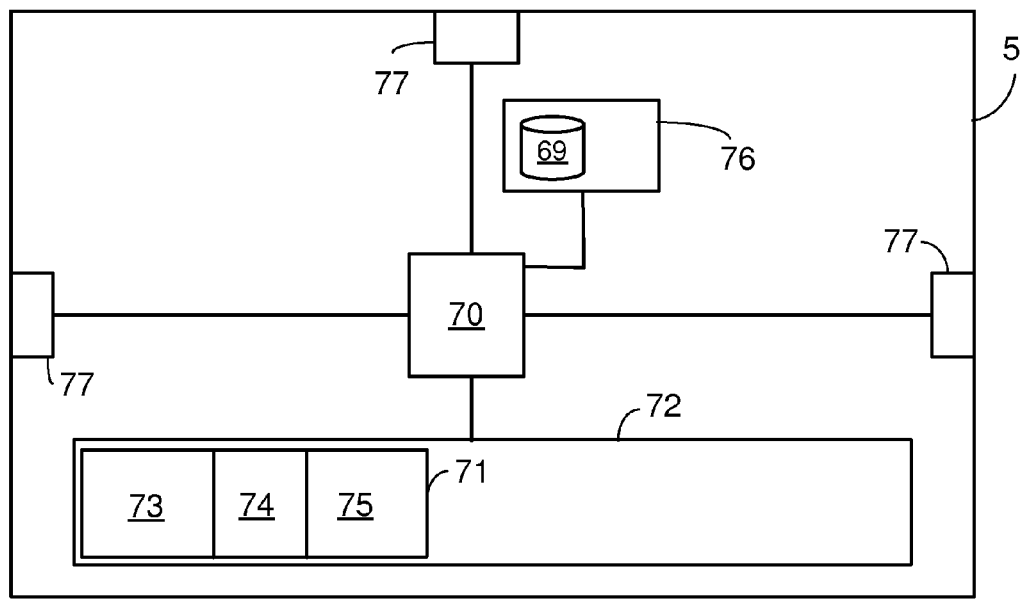

As should be readily understood by the skilled person, each one of the message means 67, the header analyzer 68 and the report requesting means 22 can be implemented in the web server host 5 as special purpose hardware circuits such as ASICs (Application Specific integrated Circuits) or as a combination of at least one computer program and at least one processor in the web server host 5. FIG. 11 schematically shows one example of an embodiment of the web server host 5 where the message means 67, the header analyzer 68 and the report requesting means 22 are implemented as a third processor 70, e.g. a microprocessor, in combination with a web server computer program 71 installed on a third computer program product 72 in the form of an eighth memory in the web server host 5. The web server computer program 71 comprises modules known to a person skilled in the art as being a part of a typical web server software, but it also comprises a message module 73, a header analyzing module 74 and an optional report requesting module 75, which modules correspond to the message means 67, the header analyzer 68 and the report requesting means 22 respectively and which in combination with the third processor 70, i.e. when the web server computer program 71 is run by the third processor 70 realizes the means illustrated in FIG. 10. It shall also be understood that the report requesting module 75 may in an alternative embodiment be a separate computer program stored on the eighth memory or another memory comprised in the web server host 5. The fourth database 69 is illustrated as being comprised in a ninth memory 76, but the fourth database 69 may of course alternatively be stored in the eighth memory. As is commonly known for web server hosts, the web server host 5 naturally also comprises input/output ports/circuits 77 for wired or wireless communication with the call-tracking system and other computers. An example of such an input/output port is an Ethernet connector and an example of a circuit for wireless communication is an IEEE 802.11 transceiver circuit, but it may also be telecommunications transceiver circuit such as an LTE (Long Term Evolution) communication circuit.

The invention claimed is:

1. A method performed by a call-tracking system, comprising:
    forwarding from a first user equipment associated with a first telephone number a request for a web page to a web server host;
    receiving in response to the request, a reply message comprising the web page and at least one second telephone number associated with a second user equipment;
    forwarding the reply message to the first user equipment;
    retrieving the first telephone number, the second telephone number, a time associated with the forwarding of the reply message to the first user equipment, and a service provider indicator for a service provider associated with the web server host;
    storing, associated with each other in a first database, the first telephone number, the second telephone number, the service provider indicator and the time associated with the forwarding of the reply message;
    receiving from a proxy server a trigger message comprising two telephone numbers, said trigger message indicating a telephone call related to the two telephone numbers;
    determining whether the two telephone numbers correspond to the first telephone number and the second telephone number stored associated with each other in the first database; and,
    if the two telephone numbers correspond to the first telephone number and the second telephone number, determining, based on a time difference between the time associated with the forwarding of the reply message and a time indicative of when the telephone call was made, whether the call has been made within one of a predetermined time and a predetermined time interval from the forwarding of the reply message; and,
    if the call has been made within the predetermined time or predetermined time interval, storing information related to the call in the first database or a second database.

2. The method according to claim 1, further comprising retrieving the second telephone number from an HTTP header of the reply message.

3. The method according to claim 1, further comprising retrieving the second telephone number from the web page.

4. The method according to claim 1, further comprising inserting in the request an information header with data indicating to the web server host that a call from the first user equipment to the second user equipment can be tracked by the call-tracking system.

5. The method according to claim 1, wherein the information related to the call comprises the first telephone number, the second telephone number, the time indicative of when the telephone call was made and the service provider indicator.

6. The method according to claim 1, further comprising:
receiving from the web server host an advertisement identity comprised in the reply message;
storing the advertisement identity in the first database associated with the first telephone number, the second telephone number, the service provider indicator and the time associated with the forwarding of the reply message; and
if the call has been made within the predetermined time or predetermined time interval, storing the advertisement identity in the second database together with the first telephone number, the second telephone number, the service provider indicator and the time associated with the forwarding of the reply message.

7. The method according to claim 5, wherein the information related to the call comprises a length of the call.

8. The method according to claim 1, wherein the call-tracking system is an HTTP proxy server.

9. A call-tracking system, comprising:
a sending circuit configured to forward from a first user equipment associated with a first telephone number a request for a web page to a web server host and forwarding a reply message from the web server host to the first user equipment;
a receiving circuit configured to receive in response to the request, the reply message comprising the web page and at least one second telephone number associated with a second user equipment;
a retrieving circuit configured to retrieve the first telephone number, the second telephone number, a time associated with the forwarding of the reply message to the first user equipment, and a service provider indicator for a service provider associated with the web server host;
a storing circuit configured to store, associated with each other, in a first database the first telephone number, the second telephone number, the service provider indicator and the time associated with the forwarding of the reply message;
a trigger receiving circuit configured to receive from a proxy server a trigger message comprising two telephone numbers, said trigger message indicating a telephone call related to the two telephone numbers;
a first determining circuit configured to determine whether the two telephone numbers correspond to the first telephone number and the second telephone number stored associated with each other in the first database;
a second determining circuit configured to, if the two telephone numbers correspond to the first telephone number and the second telephone number, determine, based on a time difference between the time associated with the forwarding of the reply message and a time indicative of when the telephone call was made, whether the call has been made within a predetermined time or predetermined time interval from the forwarding of the reply message; and,
a call indicator configured to store information related to the call in the first database or a second database, if the call has been made within the predetermined time or predetermined time interval.

10. The call-tracking system according to claim 9, further comprising an information header inserter configured to add in the request an information header with data indicating to the web server host that possible calls from the first user equipment to the second user equipment can be tracked by the call-tracking system.

11. The call-tracking system according to claim 9, wherein:
the retrieving circuit is configured to retrieve an advertisement identity from the reply message and the storing circuit is configured to store the advertisement identity in the first database associated with the first telephone number, the second telephone number, the service provider indicator and the time associated with the forwarding of the reply message;
the call indicator is configured to store the advertisement identity in the second database together with the first telephone number, the second telephone number, the service provider indicator and the time associated with the forwarding of the reply message, if the call has been made within the predetermined time or predetermined time interval.

12. The call-tracking system according to claim 9, wherein the trigger message is an Intelligent Network trigger.

13. The call-tracking system according to claim 9, wherein the service provider indicator is a Uniform Resource Locator of the service provider.

14. A call tracking system, comprising an HTTP proxy server and a Service Control Point, wherein the HTTP proxy server comprises:
a sending circuit configured to forward from a first user equipment associated with a first telephone number a request for a web page to a web server host and forwarding a reply message from the web server host to the first user equipment;
a receiving circuit configured to receive in response to the request, the reply message comprising the web page and at least one second telephone number associated with a second user equipment;
a retrieving circuit configured to retrieve the first telephone number, the second telephone number, a time associated with the forwarding of the reply message to the first user equipment, and a service provider indicator for a service provider associated with the web server host;
a storing circuit configured to store, associated with each other, in a first database the first telephone number, the second telephone number, the service provider indicator and the time associated with the forwarding of the reply message;
a call indicator configured to store, in the first database or a second database, information related to a telephone call having been made between the first telephone number and the second telephone number within a predetermined time or predetermined time interval;
a second sending circuit configured to send the first telephone number, the second telephone number, the service provider indicator and the time associated with the forwarding of the reply message to a third database; and
a second receiving circuit for receiving from the Service Control Point a message comprising the first telephone number, the second telephone number and an indication that the telephone call has been made;
the Service Control Point comprises:
a trigger receiving circuit configured to receive from a proxy server a trigger message comprising two telephone numbers, said trigger message indicating a telephone call related to the two telephone numbers;
the third database;
a first determining circuit configured to determine whether the two telephone numbers correspond to the first telephone number and the second telephone number stored associated with each other in the third database;
a second determining circuit configured to, if the two telephone numbers correspond to the first telephone number and the second telephone number, determine, based on a time difference between the time associated with the forwarding of the reply message and a time indicative of when the telephone call was made, whether the call has been made within the predetermined time or predetermined time interval from the forwarding of the reply message; and a message generator for generating and sending the message, if the telephone call related to the two telephone numbers correspond to the first telephone number and the second telephone number and has been made within the predetermined time or predetermined time interval.

15. The call-tracking system according to claim 14, further comprising an information header inserter configured to add in the request an information header with data indicating to the web server host that possible calls from the first user equipment to the second user equipment can be tracked by the call-tracking system.

16. The call-tracking system according to claim 14, wherein:

the retrieving circuit is configured to retrieve an advertisement identity from the reply message and the storing circuit is configured to store the advertisement identity in the first database associated with the first telephone number, the second telephone number, the service provider indicator and the time associated with the forwarding of the reply message;

the call indicator is configured to store the advertisement identity in the second database together with the first telephone number, the second telephone number, the service provider indicator and the time associated with the forwarding of the reply message, if the call has been made within the predetermined time or predetermined time interval.

17. The call-tracking system according to claim 14, wherein the trigger message is an Intelligent Network trigger.

18. The call-tracking system according to claim 14, wherein the service provider indicator is a Uniform Resource Locator of the service provider.

19. A computer program product stored in a non-transitory computer readable medium for controlling an HTTP proxy server, the computer program product comprising software instructions which, when run on the HTTP proxy server, causes the HTTP proxy server to:

forward from a first user equipment associated with a first telephone number a web request for a web page to a web server host, receive in response to the request, a reply message comprising the web page and at least one second telephone number associated with a second user equipment, forward the reply message to the first user equipment, retrieve the first telephone number, the second telephone number, a time associated with the forwarding of the reply message to the first user equipment, and a service provider indicator for a service provider associated with the web server host, store, associated with each other in a first database, the first telephone number, the second telephone number, the service provider indicator and the time associated with the forwarding of the reply message to the first user equipment, receive from a proxy server a trigger message comprising two telephone numbers, said trigger message indicating a telephone call related to the two telephone numbers, determine whether the two telephone numbers correspond to the first telephone number and the second telephone number stored associated with each other in the first database, and, if the two telephone numbers correspond to the first telephone number and the second telephone number, determine, based on a time difference between the time associated with the forwarding of the reply message and a time indicative of when the telephone call was made, whether the call has been made within a predetermined time or predetermined time interval from the forwarding of the reply message, and, if the call has been made within the predetermined time or predetermined time interval, store information related to the call in the first database or a second database.

20. The computer program product according to claim 19, wherein the computer program product further causing the HTTP proxy server to insert in the request an information header with data indicating to the web server host that a call from the first user equipment to the second user equipment can be tracked by the HTTP proxy server.

21. The computer program product according to claim 19, wherein the computer program product further causing the HTTP proxy server to:

receive from the web server host an advertisement identity comprised in the reply message;

store the advertisement identity in the first database associated with the first telephone number, the second telephone number, the service provider indicator and the time associated with the forwarding of the reply message; and if the call has been made within the predetermined time or predetermined time interval, store the advertisement identity in the second database together with the first telephone number, the second telephone number, the service provider indicator and the time associated with the forwarding of the reply message.

22. The computer program product according to claim 19, wherein the computer program product further causing the HTTP proxy server to retrieve the second telephone number from an HTTP header of the reply message.

23. The computer program product according to claim 19, wherein the computer program product further causing the HTTP proxy server to retrieve the second telephone number from the web page.

24. A web server host adapted for communication with a call-tracking system, comprising:

a message circuit configured to create and send to the call-tracking system a reply message to a request for a web page from a first user equipment associated with a first telephone number forwarded by the call-tracking system, where the reply message comprises the web page with at least one second telephone number and an HTTP header comprising the second telephone number; and a header analyzer configured to determine if in the forwarded request there is data indicating that a call from the first user equipment to a second user equipment associated with the second telephone number can be tracked by the call-tracking system.

25. The web server host according to claim 24, wherein the message circuit is configured to insert an advertisement identity in the HTTP header or in a second HTTP header of the reply message.

26. A web server host adapted for communication with a call-tracking system, comprising:

a message circuit configured to create and send a reply message from a forwarded request from the call-tracking system for a web page from a first user equipment associated with a first telephone number, said web-page comprising at least one second telephone number, a header analyzer configured to determine if in the forwarded request there is an information header with data indicating that a call from the first user equipment to a second user equipment associated with the second telephone number can be tracked by the call-tracking system, wherein the message circuit is configured to add an HTTP header comprising the second telephone number to the reply message if it has been determined that the information header is present in the request.

27. The web server host according to claim 26, wherein the message circuit is configured to insert an advertisement identity in the HTTP header or in a second HTTP header of the reply message.

28. A computer program product stored in a non-transitory computer readable medium for controlling a web server host, the computer program product comprising software instructions which, when run on the web server host, causes the web server host to:

create and send to a call-tracking system a reply message to a request for a web page from a first user equipment associated with a first telephone number forwarded by the call-tracking system, where the reply message comprises the web page with at least one second telephone number and an HTTP header comprising the second telephone number;

the computer program product further causes the web server host to determine if there is in the forwarded request data indicating that a call from the first user equipment to a second user equipment associated with the second telephone number can be tracked by the call-tracking system.

29. The computer program product according to claim 28, wherein the computer program product further causes the web server host to insert an advertisement identity in the HTTP header or in a second HTTP header of the reply message.

30. A computer program product stored in a non-transitory computer readable medium for controlling a web server host, the computer program product comprising software instructions which, when run on the web server host, causes the web server host to:

create and send a reply message to a call-tracking system for a request for a web page forwarded from a first user equipment associated with a first telephone number, said web page comprising at least one second telephone number;

determine if there is in the forwarded request an information header with data indicating that a call from the first user equipment to a second user equipment associated with a second telephone number can be tracked by the call-tracking system; and add an HTTP header comprising the second telephone number to the reply message only if it has been determined that the information header is present in the request.

31. The computer program product according to claim 30, wherein when the computer program product is run on the web server host, causes the web server host to insert an advertisement identity in the HTTP header or in a second HTTP header of the reply message.

\* \* \* \* \*